United States Patent Office 3,374,876
Patented Mar. 26, 1968

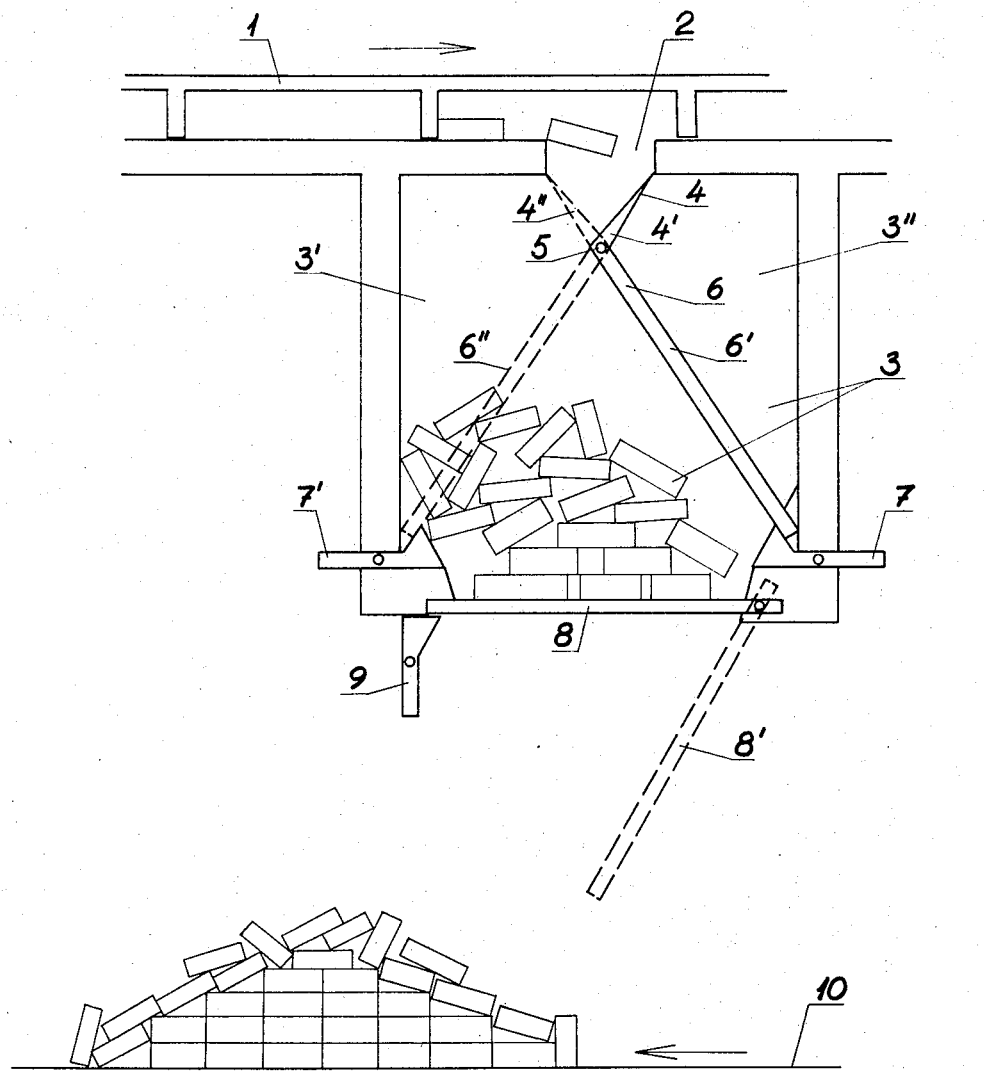

3,374,876
ARTICLE RECEIVING HOPPER
Alpo Rysti, Frisans, Finland, assignor to Sateko Oy, Helsinki, Finland, a corporation of Finland
Filed Oct. 26, 1966, Ser. No. 589,724
Claims priority, application Finland, Apr. 23, 1966, 1,065/66
2 Claims. (Cl. 198—68)

ABSTRACT OF THE DISCLOSURE

An article receiving hopper has a top opening and a shaft located within the hopper and carrying a swingable guide plate and a swingable partition. The guide plate and the partition divide the interior of the hopper into two compartments so that timber can be dropped through the top opening into any one of these two compartments. The partition can be located in any one of two end positions. The bottom of the hopper is constituted by a lockable discharge hatch, so that timber can be dropped from the hopper upon a conveyor or the like.

---

The present invention has reference to a device for the sorting of timber or equivalent and most suitably for its subsequent packaging.

In sorting timber, especially sawn timber, conveyors are frequently employed by means of which timber is transported transversally, and openings transversal to the transporting direction have been provided in the plane of transport most suitably for dropping each particular timber length into its proper compartment. Such sorting may also be carried out in the manner that timber is transported in suspended hooks of a conveyor or equivalent, the hooks being triggered at specified dropping points.

In such instances it is frequent practice to deposit a predetermined number of pieces of timber into the compartments. Since the choices of sorting are numerous and may even amount to several score, a number of compartments may become filled simultaneously and their rapid emptying poses a time problem. For this reason supernumerary, or standby, compartments have to be provided into which the timber is directed, but the conveyor will then become long and expensive. It is also often indispensable that timber of a given kind should always be discharged from one and the same compartment. It is then also a known procedure to discharge the timber, compartment by compartment (most suitably from one compartment at a time) onto a transport conveyor under the compartments for transport by means of this conveyor e.g. to be packaged. Intermediate bottoms have been arranged in the compartments, the intermediate bottom being closed after the number of pieces to make up one package has accumulated in the part of the compartment under it. Subsequently (after the said number of pieces for one package has been completed), the timber assigned to the same compartment is deposited upon the said intermediate bottom. After the part of the compartment under it has been emptied, the intermediate bottom is opened and the timber that has accumulated on it in the meantime is allowed to fall into the said part of the compartment under it. This arrangement has the drawback that the compartments will be rather high. Moreover, opening and closing the intermediate bottom is a time-consuming operation.

An object of the present invention is to eliminate the above-mentioned drawbacks.

The present invention is described in greater detail with reference to the attached drawing, which shows one embodiment of the invention in side view and mostly in section.

1 is a transversal conveyor by means of which each piece of timber of given dimensions, most suitably of given length, is carried along the transport plane and dropped through its proper opening into its compartment 3, which consists of two pockets 3' and 3" arranged in parallel. Under the said opening 2 a turnable guide plate 4 is found, which can be turned either into position 4' to direct the timber into the left pocket 3', or into position 4" to direct the timber into the right-hand pocket 3". The guide plate or equivalent 4 is mounted on a shaft 5. For separation of the pockets 3' and 3" there is a partition 6 between them, also most suitably mounted on the shaft 5. This partition 6 has been arranged so that it can be placed either in the right-hand position 6' or in the left position 6" so that the timber can be discharged from either pocket 3' or 3" through one and the same discharge opening, as can be seen from the drawing. To keep the said partition 6 in the left position the pawl 7' has been provided, and for its retention in the right-hand position the pawl 7. The bottom of the compartment is the discharge hatch 8, which can be opened and which is secured in its closed position by the locking device 9. The said pawls and the locking device are so placed (most suitably outside the compartment) that they cannot be damaged or unintentionally actuated by the falling timber. As can be seen from the drawing, the pawls 7 and 7' are so shaped at their end inside the compartment that the partition 6, possibly under pressure exerted by the timber resting on it, can become automatically locked in its operating positions 6' or 6". From the pockets of the compartment, the timber is allowed to fall on the conveyor 10 provided under it, by means of which the timber quantity consistent with the amount required for one package is transported to the packaging device or devices most suitably arranged in connection with the conveyor 10. The timber may also be discharged e.g. into a carriage, on a roller conveyor or onto equivalent transport equipment.

The operation of the device is as follows:

Solid lines in the drawing present the position of guide plate 4 and partition 6 (i.e., guide plate 4 in position 4' and partition 6 in position 6') during the period when the timber is still directed from the conveyor 1 through opening 2 into the left pocket 3'. The bottom of the compartment 3 is then closed by the hatch 8. When the counter (not shown) has signalled the requisite amount of timber in the pocket 3' on the left side of the partition in its position 6', the guide plate 4 is arranged to turn automatically into position 4", whereafter the timber assigned to the compartment will be directed into the pocket 3". Alternatively, the guide plate 4 may be turned into its other position by hand, e.g. by means of an actuating lever or equivalent. Next, the filled pocket 3' on the left side of position 6' of the partition 6 is emptied, which is achieved by shifting the discharge hatch 8 into its opened position 8'. This makes the timber in the said pocket fall onto the conveyor 10. After completed discharge, the hatch 8 is closed and secured with its locking device 9. At the same time pawl 7 is disengaged so that the partition 6 is freed from the locking at its lower end. When more timber accumulates on the right-hand side of partition 6, it will eventually push the partition into its left position 6", where it is caught behind the pawl 7'.

The operation of the device is thus continuous, with the guide plate 4 being turned to the right or left and the partition 6 being locked in its end positions. A further advantage gained with such an arrangement of the compartments is that only one discharge hatch is needed for the compartment and that the compartment as a whole will be comparatively narrow because at a later stage of the filling of its pockets the said pockets increase in capacity, which is most suitably arranged to take place automatically. The advantage is moreover gained that the pockets are very easily discharged. More efficient utilization of the compartment is also achieved owing to the fact that the timber, on being deposited on the conveyor 10, already of itself forms a substantially pyramidal heap.

The invention is by no means restricted to the embodiment described above and various modifications are conceivable within the scope of the claims. For instance, the guide plate and/or the partition may equally be composed of bars or equivalent. The partition 6 may furthermore be balanced by means of a counterweight most suitably placed outside the compartment so that the partition will move and operate with little effort. It is also possible, of course, to make the partition stationary, in which case both pockets on either side of the partition have their individual discharge hatch, which can be individually opened. Alternatively, there may be a partition between the pockets of the compartment which is fixed in its upper part, with a turnable partition only from this part downward.

I claim:

1. An article receiving hopper, comprising a hopper casing having a top opening and a discharge hatch constituting the bottom of the casing, means swingably connecting one end of said discharge hatch to said casing, a shaft mounted within said casing, a guide plate mounted upon said shaft and swingable from a position wherein it extends close to one side of said opening to a position wherein it extends close to the other side of said opening, a partition mounted upon said shaft and swingable from a position wherein it extends close to one side of said discharge hatch to a position wherein it extends close to the other side of said discharge hatch, whereby the different positions of said guide plate and said partition define two compartments within said casing, each of said compartments communicating with said opening, locks located close to the two sides of said discharge hatch for locking said partition in one of said two positions, and a lock maintaining the discharge hatch in its closed position.

2. A hopper in accordance with claim 1, wherein all of said locks are operable from outside of said casing.

References Cited

UNITED STATES PATENTS

| | | | |
|---|---|---|---|
| 1,325,602 | 12/1919 | Albright | 198—68 X |
| 2,632,588 | 3/1953 | Hoar | 198—40 X |
| 3,092,264 | 6/1963 | Milek | 198—68 X |

EVON C. BLUNK, *Primary Examiner.*

R. J. HICKEY, *Assistant Examiner.*